United States Patent

Shimaya et al.

[11] Patent Number: 5,184,982
[45] Date of Patent: Feb. 9, 1993

[54] TENSIONER DEVICE FOR CHAINS AND THE LIKE

[75] Inventors: Kazuhiko Shimaya, Hidaka; Masaki Miyaji, Hanno; Kozo Inoue, Nagoya, all of Japan

[73] Assignee: Tsubakimoto Chain Co., Osaka, Japan

[21] Appl. No.: 867,859

[22] Filed: Apr. 13, 1992

[30] Foreign Application Priority Data

Apr. 11, 1991 [JP] Japan .................. 3-32353

[51] Int. Cl.⁵ .............................. F16H 7/00
[52] U.S. Cl. ...................... 474/101; 474/111; 474/138
[58] Field of Search ............. 494/101, 109-111, 494/113-117, 133-138, 140

[56] References Cited

U.S. PATENT DOCUMENTS 4,881,927 11/1989 Suzuki ................. 474/138 X
5,006,095 4/1991 Suzuki ................. 474/111

Primary Examiner—Thuy M. Bui
Attorney, Agent, or Firm—Howson & Howson

[57] ABSTRACT

A device for applying tension to an endless chain, belt or the like comprises a ratcheted plunger having a substantially planar face disposed in substantially perpendicular relationship to the axis of movement of the plunger, and a chain or belt-engaging lever having a pad with a convex face arranged to contact the substantially planar face of the plunger. Vibrational forces exerted by the lever on the tensioner are substantially parallel to the axis of movement of the plunger, so that wear of the plunger and plunger guide are significantly reduced.

1 Claim, 6 Drawing Sheets

TENSIONER DEVICE FOR CHAINS AND THE LIKE

BRIEF SUMMARY OF THE INVENTION

This invention relates to a device for applying tension to an endless power transmission in the form of a chain, belt or the like.

Tensioners of the kind to which the invention relates have many applications. A typical example is the maintenance of tension of the timing belt of an internal combustion engine, i.e. the belt which connects a valve-operating camshaft to a crankshaft.

It is conventional practice to apply a predetermined tension to a power transmission chain or belt in order to prevent skipping of chain or belt over sprocket teeth, or to prevent slipping in the case of a smooth belt. A typical tensioner assembly comprises a lever pivoting about a pin projecting from a fixed member, and a plunger which applies a force to the lever, causing the lever to bear against the chain or belt.

The plunger can be part of a hydraulic tensioner, or can be spring-operated. Alternatively, a hybrid tensioner can be used, which includes both a spring and a hydraulic fluid. In a typical hydraulic tensioner, the plunger is designed to project rapidly in order to apply a tensioning force quickly when slack is encountered, and to withdraw slowly when excess tension is encountered. In a typical spring-operated tensioner, the plunger is urged in a projecting direction by a compressed coil spring, and includes a ratchet mechanism which allows the plunger to move in the projecting direction but prohibits movement of the plunger in the retracting direction. The spring and part of the plunger are contained within a frame. The ratchet mechanism comprises a rack formed on the plunger and extending in the longitudinal direction thereon, and a cooperating pawl mounted on the frame. The pawl is pivoted at a location remote from the rack teeth, and consequently the ratchet mechanism allows a small amount of play in the axial movement of the plunger.

A thin flat plate is press fit on the end of the plunger. A pad, made of synthetic resin, is attached to the thin flat plate, and is used to transmit forces between the plunger and the lever of the tensioner mechanism.

In the conventional tensioner described above, the plunger exerts a force on the lever but also has forces exerted on it by the lever. The forces exerted on the plunger by the lever include forces caused by the vibration of the chain or belt as it moves while in contact with the lever. Because the lever is pivoted at a location remote from the axis of movement of the plunger, these vibrational forces are not necessarily directed parallel to the axis of movement of the plunger. The vibrational force can be broken down into an axial component parallel to the plunger axis, and a lateral component perpendicular to the plunger axis.

Because of the motion of the chain or belt, the plunger is repeatedly exposed to the lateral component of force. The axial component causes the plunger to reciprocate axially into and out of the frame to the extent allowed by play of the ratchet mechanism. At the same time, the lateral component of force urges the plunger against a guiding surface of the frame in which it is supported. The repeated plunger movement caused by these forces wears down the plunger and frame in the area where they are forced to contact. This wear ultimately results in more play, and, when the play becomes excessive, the tensioner can fail to apply proper tension to the chain or belt.

Excessive play resulting from wear of the plunger and its frame can also cause the tip of the rack teeth to engage the pawl in such a way as to press the plunger radially against its frame with such a force that the spring fails to extend the plunger when a slack is encountered in the chain or belt.

A further problem resulting from vibration of the tensioner mechanism is that the flat plate which is press fit onto the plunger can become disengaged from the plunger as a result of the vibratory forces.

The general object of this invention is to improve the useful life and reliability of a tensioner by eliminating or reducing the adverse effects of vibration. It is a further object of this invention to reduce or eliminate wear in a tensioner. Other objects include the elimination of excessive play of the plunger with respect to the frame, prevention of the impairment of the function of the ratchet mechanism, and elimination of the problems associated with the flat plate press-fit on the end of the plunger.

The invention addresses these objects by providing a tensioner with a plunger means having a planar face disposed in substantially perpendicular relationship to the axis of movement of the plunger means. No thin flat plate and pad are mounted on the end of the plunger. Instead, a pad is mounted on the tensioner lever. The pad has a convex, preferably circular cylindrical, face and is arranged to contact the substantially planar face of the plunger means. Forces are exerted, by and on the plunger, through the line of contact of the planar face of the plunger means and the convex face of the tensioner lever pad. This limits the direction of vibrational forces, exerted on the plunger by the lever as a result of chain or belt movement, to the direction substantially parallel to the plunger's axis of movement. Lateral components of force are eliminated by the relationship of the contacting faces. As a result, wear and tear on the plunger and frame are reduced, and excessive play of the plunger is eliminated. The structure of the tensioner in accordance with the invention eliminates the need for a flat pad mounting plate, and thus eliminates some fabrication difficulties and the problem of accidental disengagement associated with the flat plate.

Still other objects, features and advantages of the invention will become apparent from the following detailed description when read in conjunction with the accompanying drawings.

DETAILED DESCRIPTION

Figure 7:
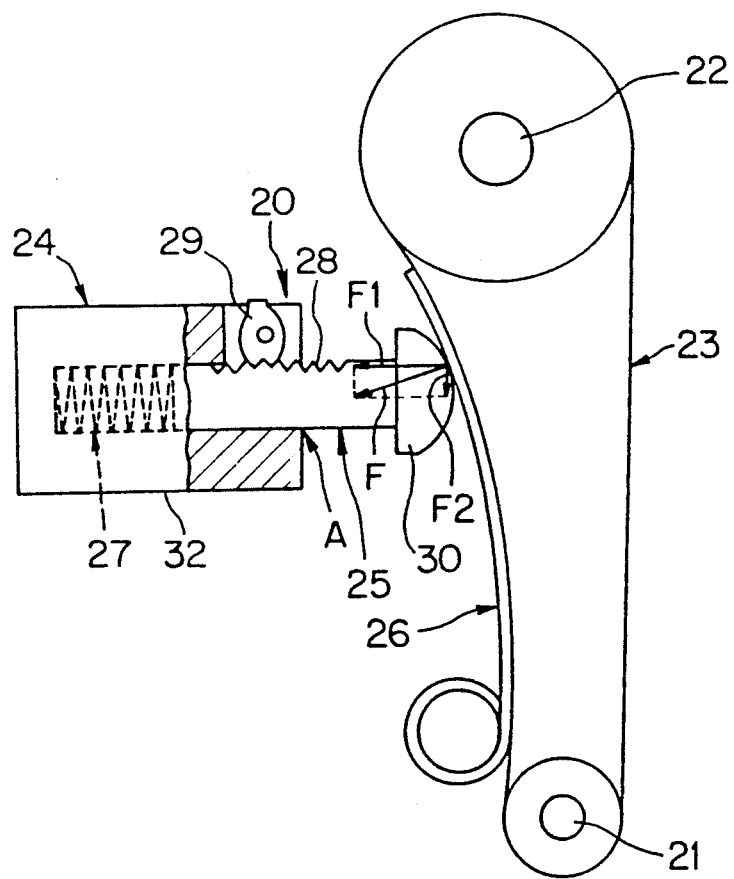
FIG. 7 is an elevational view, partly in section, showing a tensioner according to the prior art applying tension to an endless power transmission.

The typical prior art tensioner 20 illustrated in FIG. 7 comprising a frame and plunger assembly 24 and a lever 26. Tensioner 20 applies tension to an endless chain 23 which serves as a power transmission for transmitting rotation between a crankshaft 21 and a camshaft 22. Tension is applied to chain 23 to reduce vibration of the chain, and to prevent skipping of teeth when sudden changes in engine speed occur.

Assembly 24 comprises a frame 32 which slidably receives a plunger 25. A spring 27, inside the frame, urges the plunger in the projecting direction. A rack 28 is formed on the plunger and extends in the longitudinal direction. The rack cooperates with a pawl 29 on the frame to provide a ratchet mechanism which allows the plunger to move, under the urging of spring 27 in the projecting direction, while preventing movement of the plunger in the retracting direction. A certain amount of axial play of the plunger, however, is inherent in the ratchet operation because of the fact that the pawl is pivoted at a location remote from the rack.

At the projecting end of the plunger, a pad 30 is mounted for engagement with lever 26. Spring 27 urges plunger 25 against lever 26, and the lever, in turn, bears against chain 23 to apply tension to the chain.

Figure 8:
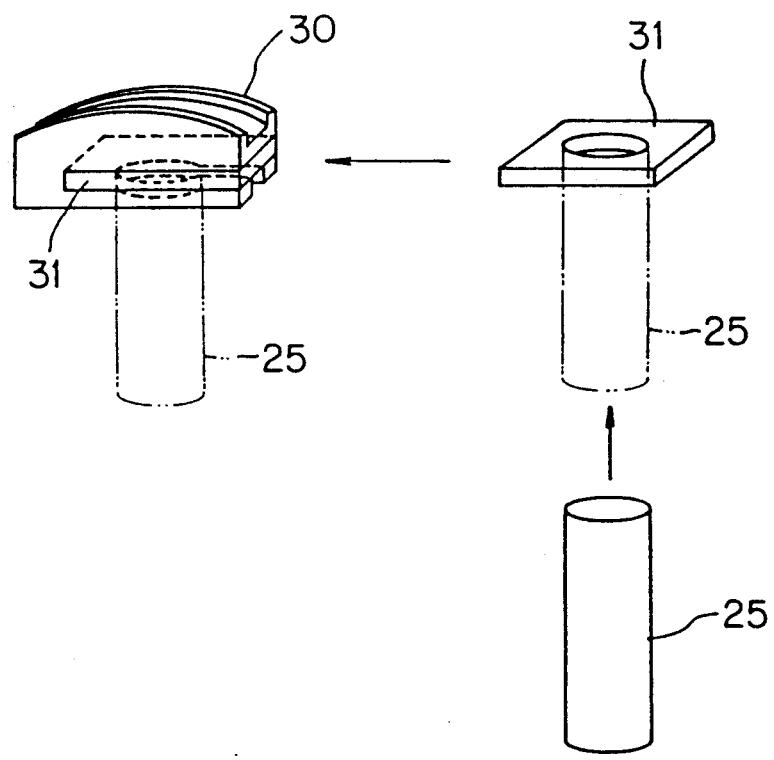
FIG. 8 is an exploded perspective view showing the assembly of a plunger, flat plate and pad according to the prior art.

Pad 30, as illustrated in FIG. 8, is mounted onto a thin, flat plate 31 which is press fit onto plunger 25. The assembly of the plunger, plate and pad is time-consuming. Furthermore, because the plate is thin, it is susceptible to disengagement from the plunger as a result of repeated vibrations over a period of time.

Referring to FIG. 7, pad 30 is vibrated by chain 23 through lever 26 during circulating movement of the chain. The vibration of chain 23 causes the lever to exert a force "F" on tensioner 24. The combination of force "F" and the force exerted by spring 27 will cause movement of the plunger to the extent allowed by rack 28 and pawl 29. Force "F" is applied in a direction crossing the axis of movement of plunger 25. Force "F" can be divided into an axial component "F1" which is parallel to the direction of movement of plunger 25, and a transverse component "F2" which is perpendicular to the axis of movement of the plunger.

Tensioner 24 has the following problems. Force component "F2" causes plunger 25 to contact frame 32 at a location "A" which results in eventual wear of the plunger and of the frame at location "A". The worn condition of the plunger and frame allows for more movement of plunger 25, and can result in failure of the device to apply the proper amount of tension to chain 23. In addition, the excessive wear can allow the end of pawl 9 to contact the tips of the teeth of the rack in such a way that plunger 25 is pressed against frame 32 with such a force that the plunger is not extended by the pressure of spring 27.

Figure 1:
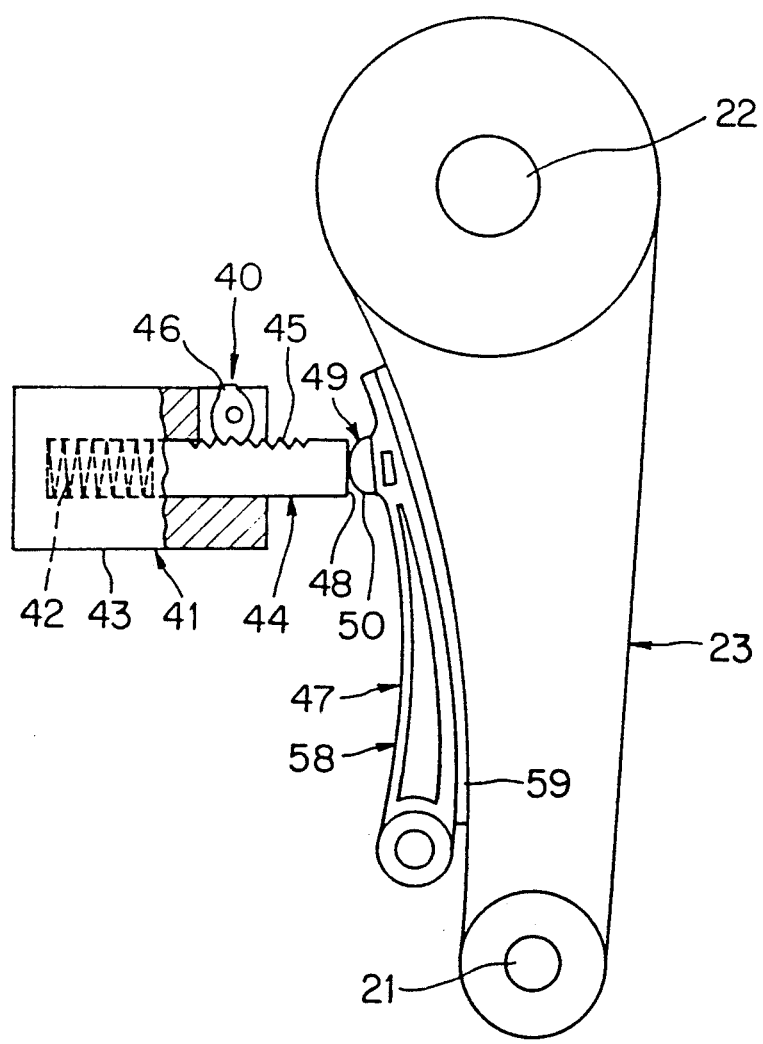
FIG. 1 is an elevational view, partly in section, showing a tensioner according to the invention applying tension to an endless power transmission.

As illustrated in FIG. 1, a tensioner 40 in accordance with the invention comprises a frame and plunger assembly 41 and lever 47. Tensioner 40 applies tension to an endless chain 23 which serves as a power transmission for transmitting rotation between a crankshaft 21 and a camshaft 22.

Tensioner 41 comprises a frame 43, a plunger 44 slidable axially therein, a spring 42 urging the plunger in the projecting direction, a rack 45 formed on the plunger, and a pawl 46 cooperating with the rack to allow projecting movement of the plunger, while preventing retracting movement. As in the case of the conventional mechanism of FIG. 7, the rack and pawl allow a small amount of play in the movement of the plunger.

Spring 42 urges plunger 44 against lever 47, which bears against chain 23. Plunger 44 has a substantially planar face 48 which is in a plane substantially perpendicular to the direction of movement of the plunger.

Lever 47 comprises an arm 58, a chain-engaging shoe 59 on one side, and a pad 49 on the opposite side. Pad 49 has a convex face 50, preferably in the form of a circular cylinder. This convex face of the pad contacts the planar face 48 of plunger 44.

Figure 3:
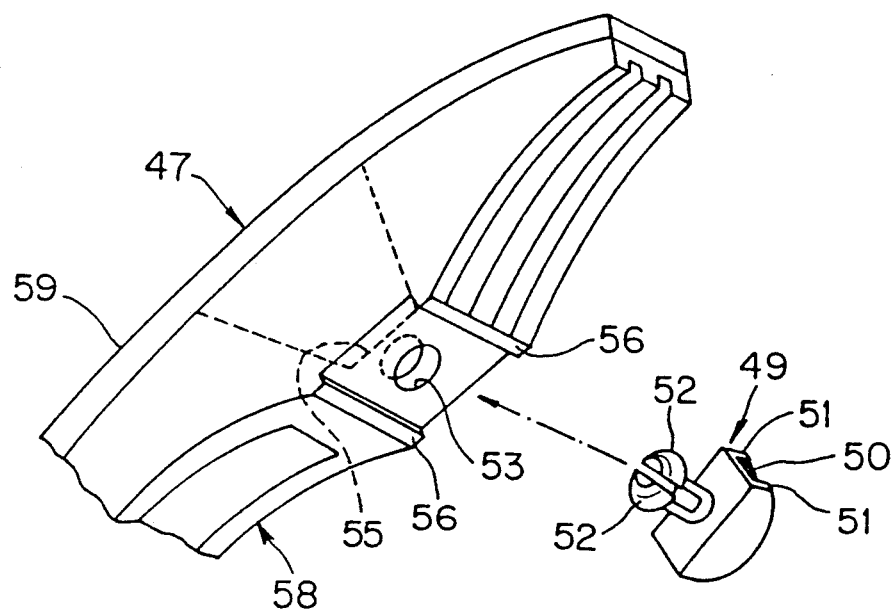
FIG. 3 is a exploded perspective view illustrating the mounting of a pad onto a lever.
Figure 4:
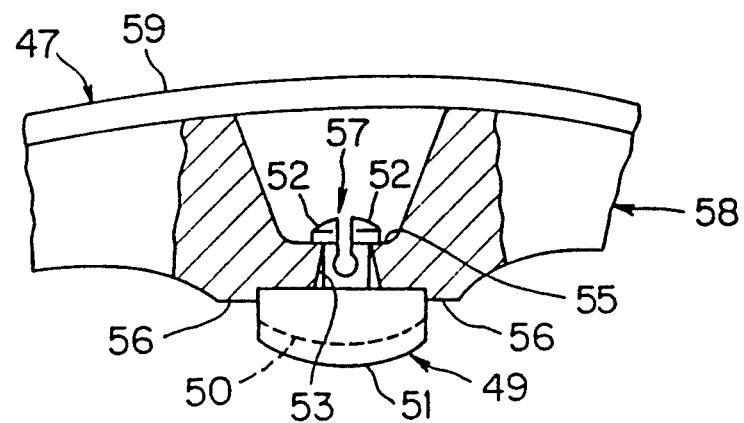
FIG. 4 is a fragmentary elevational view, partly in section, illustrating the mounting of the pad on the lever.

Pad 49, as illustrated in FIGS. 3 and 4, is formed with a pair of anti-slip walls 51 on both sides of convex surface 50 and a projection 57 including a pair of snap elements 52 on the portion of the pad which engages arm 58 of lever 47. Anti-slip walls 51 engage plunger 44 such that planar face 48 of plunger 44 does not lose contact with convex face 50 of pad 49. Pad 49 is mounted on arm 58 by inserting the pair of snap elements 52 into an aperture 53 of arm 58. The collars of snap elements 52 engage with the back wall 55 of arm. Pad 49 is prevented from rotating with respect to arm 58 by a pair of parallel projections 56 of arm 58.

Figure 5:
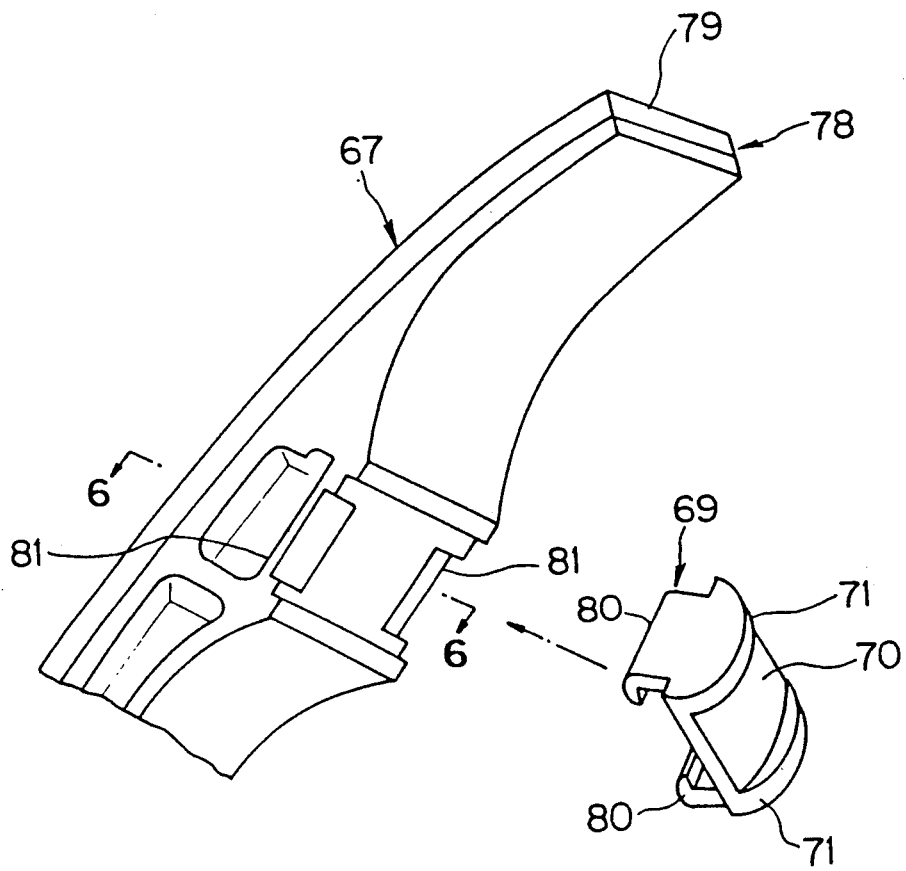
FIG. 5 is an exploded perspective view of an alternate construction for mounting a pad onto a lever.
Figure 6:
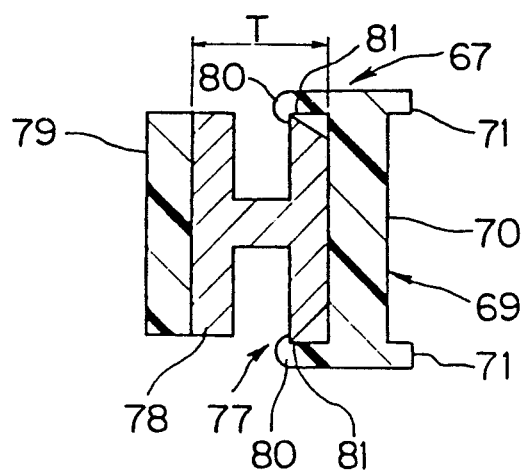
FIG. 6 is a sectional view taken on plane 6—6 of FIG. 5.

An alternative pad mounting construction is illustrated in FIGS. 5 and 6, on a lever 67 which has a shoe 79. The pad 69 has a convex surface 70 and a pair of anti-slip walls 71 for engaging the tensioner. Pad 69 has a pair of elastic hooks 80 which project from the back side of pad 69 and engage the flange 81 of the arm 78. This alternative mounting construction is particularly useful where a thickness "T" of arm 78 is small.

Figure 2:
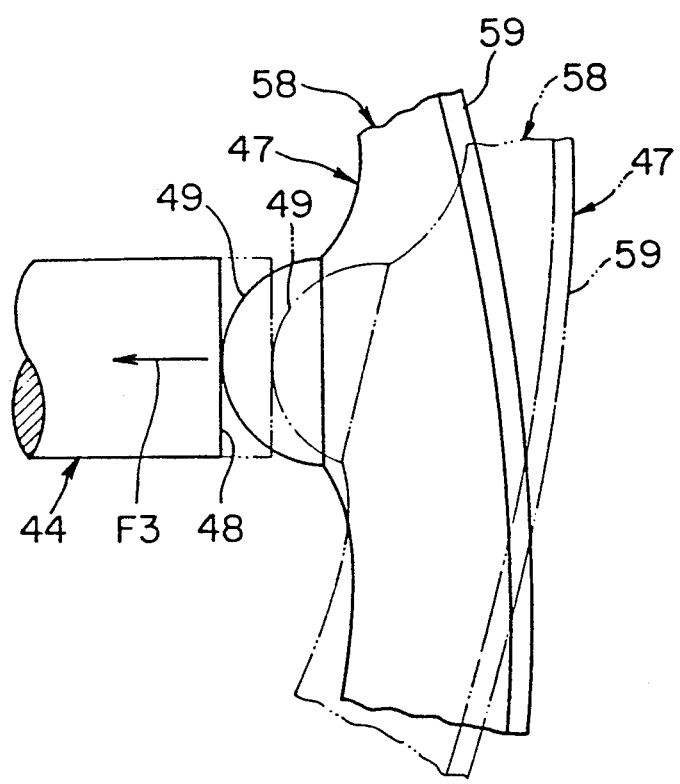
FIG. 2 is a fragmentary elevational view showing the details of the contact between a pad on a tensioner lever and the flat face of a plunger in accordance with the invention, including an illustration of the direction of vibratory forces applied by the tensioner lever to the plunger.

As shown in FIG. 2, planar face 48 of the plunger is contacted by the convex face of pad 49 in such a way that force "F3", exerted on the plunger, is substantially parallel to the axis of movement of plunger 44. By virtue of the fact that the face of the plunger is substantially perpendicular to the axis of plunger movement and the plunger is contacted by a convex face of the lever pad, transverse forces on the plunger are substantially eliminated. Thus, the invention significantly reduces wear and tear on the plunger and its frame due to vibration, provides for more reliable operation, and extends the useful life of the tensioner.

While the convex face of pad 49 is preferably in the form of a circular cylinder, the face of the pad can be spherical or any other shape such that the force "F3", exerted by the pad on the plunger, is substantially parallel to the axis of movement of the plunger.

Various other modifications, which will occur to persons skilled in the art, can be made without departing from the scope of the invention, as defined in the following claim.

We claim:

1. A device for applying tension to an endless power transmission in the form of a chain, belt or the like, comprising:
   (a) a tensioner having plunger means movable along an axis for exerting a tensioning force to said endless power transmission through a lever, said plunger having a substantially planar face disposed in substantially perpendicular relationship to the axis of movement of said plunger; and (b) a lever adapted to engage said endless power transmission, said lever carrying a pad having a convex face arranged to contact said substantially planar face of said plunger, the tensioning force exerted by said plunger being transmitted to said lever through contact of said substantially planar face with said convex face of said pad;

whereby any vibrational forces exerted by said lever on said tensioner are substantially parallel to said axis.

* * * * *